United States Patent [19]

Teller

[11] 4,401,444
[45] Aug. 30, 1983

[54] PROCESS FOR REMOVING PARTICULATES FROM GAS WITH LIQUID PARTICULATE CONDENSATION

[75] Inventor: Aaron J. Teller, Westboro, Mass.

[73] Assignee: Teller Enviromental Systems, Inc., Shrewsbury, Mass.

[21] Appl. No.: 297,061

[22] Filed: Aug. 27, 1981

[51] Int. Cl.³ .................. B01D 47/05; B01D 47/10
[52] U.S. Cl. ................................. 55/20; 55/21; 55/89; 55/91; 55/226; 55/230; 261/DIG. 54
[58] Field of Search ............ 55/20, 21, 84, 85, 91, 55/226, 230; 261/DIG. 54

[56] References Cited

U.S. PATENT DOCUMENTS

| 3,548,568 | 12/1970 | Carson, Jr. et al. | 55/84 |
| 3,703,800 | 11/1972 | Courbon | 261/DIG. 54 |
| 3,883,327 | 5/1975 | Thompson et al. | 55/94 |
| 3,894,851 | 7/1975 | Gorman | 55/94 |
| 3,957,464 | 5/1976 | Teller | 55/85 |
| 3,969,482 | 7/1976 | Teller | 55/71 |
| 4,153,432 | 5/1979 | Beman et al. | 261/DIG. 54 |

FOREIGN PATENT DOCUMENTS 581975 11/1977 U.S.S.R. ................. 55/84

*Primary Examiner*—David L. Lacey
*Attorney, Agent, or Firm*—Thompson, Birch, Gauthier & Samuels

[57] ABSTRACT

Submicron particulates are removed from an effluent gaseous stream by nucleation. The nucleation is effected at isothermal conditions by varying the static pressure of the gas.

6 Claims, 3 Drawing Figures

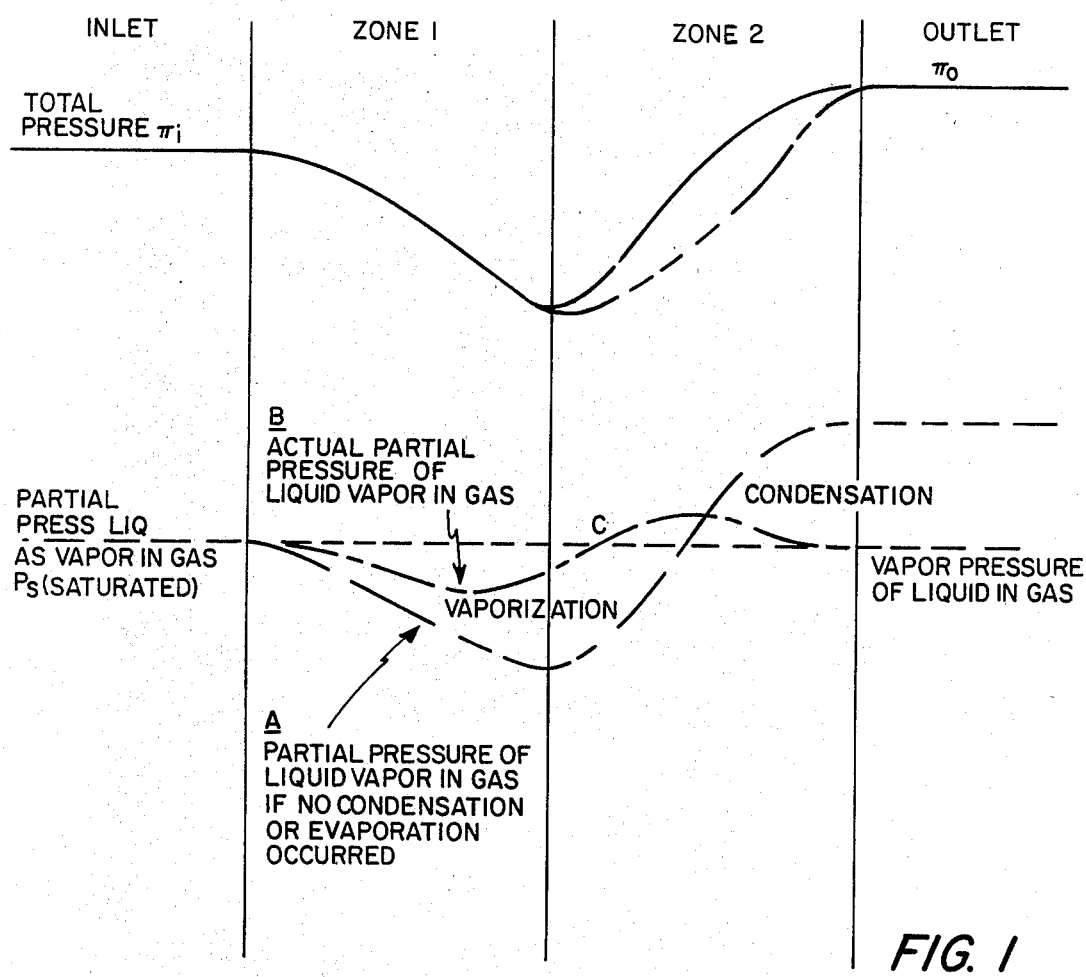
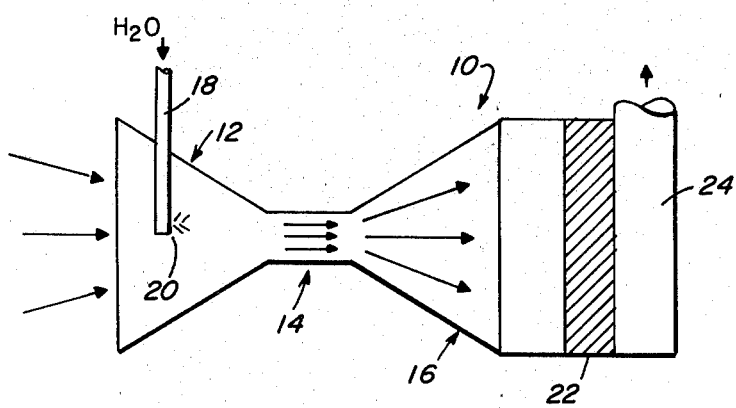
FIG. 2
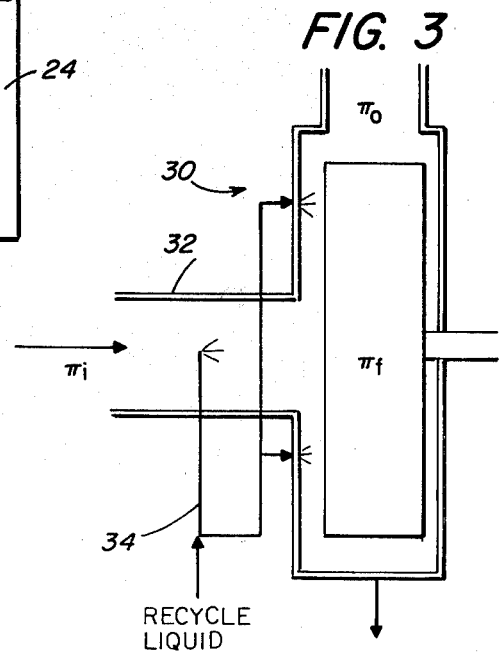
FIG. 3

PROCESS FOR REMOVING PARTICULATES FROM GAS WITH LIQUID PARTICULATE CONDENSATION

BACKGROUND OF THE INVENTION

The invention relates to a method for removing particulate matter from a gaseous stream. More specifically, it is directed to removing submicron particulates from a gaseous stream by nucleation.

The removal of contaminant particles from gaseous streams is accomplished in different ways such as by chemical reaction or physical separation. The latter methods include cyclone separators; fabric filters, such as baghouses; electrostatic precipitators; adsorption on solid surfaces; and "washing".

These methods are generally commercially suitable for the removal of larger particulate sizes but are less effective for capturing or removing submicron particulates.

In order to remove submicron particulates, various methods employing venturi scrubbers have been suggested; see for example, U.S. Pat. Nos. 4,141,701; 3,894,851; and 3,883,327. In the removal of particulates with venturi scrubbers, the particulate-laden gas is accelerated to high velocity in a venturi while water is injected through spray nozzles located in or adjacent the throat portion of the venturi. Nucleation such as described in U.S. Pat. No. 4,049,399 is a low energy process for removal of submicron particulates where the particulates function as the nucleating agents for condensation of water vapor. Generally, the prior art accomplishes this heterogeneous nucleation where the population density of the water molecules in the gas phase is adequate to develop the nucleation or condensation phenomenon. Alternatively, it is also enhanced by cooling the gas such that there is greater condensation occurring on the submicron particulates.

The present invention is directed to a method to enhance the nucleation process by increasing the water content of the gas above "saturation" conditions with isothermal operation and with minimum consumption of energy. Thus, the "efficiency" of nucleation is increased.

SUMMARY OF THE INVENTION

The present process is directed to the removal of submicron particulates from an effluent gaseous stream by nucleation which nucleation achieves condensation of water vapor selectively on the submicron particulates. The particulates act as nuclei and the condensation phenomenon ultimately results in particulate-infected water droplets.

In the preferred embodiment of the invention, the enhanced nucleation is accomplished at isothermal conditions by varying the static pressure of the gas (FIG. 1).

More particularly, a gaseous stream with suspended submicron particulates passes through two zones where a static pressure variation is imposed on the stream in the presence of recycled liquid at the gas temperature and of such quantity that the overall temperature is essentially constant.

The gas saturated with the liquid vapor and at the wet bulb temperature enters zone 1 at temperature $T_s$, total pressure $\pi_i$, and the partial pressure of the liquid vapor in the gas, $P_s$.

The total or static pressure is decreased in this zone while the temperature T remains essentially constant. The partial pressure of the liquid vapor in the gas will normally decrease in the same proportion as the total pressure (line A). However, in the presence of large quantities of the liquid at temperature $T_s$, liquid will vaporize into the gas stream to maintain a partial pressure of the liquid in the vapor in equilibrium with the temperature of the liquid (vapor pressure $P_s$ in equilibrium with the liquid at temperature $T_s$).

As noted in the figure, the partial pressure of the liquid in the gas will tend to assume the level of $P_s$ by continuous vaporization occurring in zone 1.

As the gas proceeds to zone 2, the total pressure is increased. The partial pressure of the liquid in the gas will tend to rise proportionately to the total pressure. When the partial pressure of the liquid in the gas exceeds the vapor pressure of the liquid, point C, then the equilibrium is again disturbed and condensation of the vaporized liquid begins.

As noted in FIG. 1, the final pressure $\pi_o$ exceeds $\pi_i$. This is not critical in the process as long as the partial pressure of the liquid vapor in the gas exceeds $p_s$ at any point in the process, and it must if any static pressure recovery occurs.

The condensation occurs selectively on the submicron particulates suspended in the gas stream. In effect, the submicron particulates function as nuclei for the condensation of liquid in the supersaturated gas forming wetted particles. The particles by inelastic Brownian collision agglomerate to a size sufficient to be captured by very low energy conventional collection methods. Thus, enhanced nucleation is achieved at isothermal conditions by varying the static pressure of the gas in the presence of sufficient quantity of dispersed liquid in temperature equilibrium with the inlet gas to maintain isothermal conditions.

BRIEF DESCRIPTION OF THE DRAWINGS

FIG. 1 is a chart showing the vapor pressure, partial pressure relationship; and FIGS. 2 and 3 are schematics of units used in the embodiment of the invention.

DESCRIPTION OF THE PREFERRED EMBODIMENT

The invention will be described with reference to the removal of pollutant material of solid or liquid particulate matter from gaseous streams. The invention has particular application for removing particulates of one micron or less. Typically, the gaseous stream is pretreated to remove larger particles.

Referring to FIG. 2, a venturi 10 is shown and comprises a converging inlet 12, a throat section 14 and a diffuser 16. A conduit 18 is secured to the converging inlet 12 and includes a liquid dispersing nozzle 20 at its discharge end. Depending in part upon the flow rate of the gaseous stream, particulate loading, static pressure drop desired and flow rate of water introduced into the converging section, the nozzle may extend into the throat and be oriented in any direction. Furthermore, a plurality of nozzles may be used.

In communication with the discharge end of the diffuser 16 is a mist eliminator 22 with discharge conduit 24.

A gaseous stream is introduced into the converging section 12 of the venturi. Water is introduced through the nozzle 20 into the converging section. The nozzle may be a pressure rated, a preumatic rated or a spinning disk fluid atomization rated nozzle. The discharged droplets have a length mean diameter (LMD) of 50-2,000 microns. The liquid flowing through the conduit has a flow rate of 20-150 GPM/1,000,000 ACFM. The dispersed liquid is added to and suspended in the gas and the combined stream then passes through the throat section 14. When the stream flows through the throat section, the static pressure $\pi$ decreases and the partial pressure $P_l$ of the liquid in the gas stream decreases, while the vapor pressure of the water $P_s$ under isothermal conditions remains constant. Thus, liquid evaporates into the gas stream.

When the gas flows into the diffuser 16, the static pressure $\pi$ increases with reference to static pressure in the throat section and the partial pressure $P_l$ increases with reference to the partial pressure in the throat section. The partial pressure exceeds the vapor pressure $P_s$ equilibrium curve, resulting in condensation of the water on the submicron particulates (heterogeneous nucleation). The particulates function as nuclei and the particulate-infected liquid droplets are removed from the stream by conventional equipment such as the mist eliminator 20.

The following example illustrates the use of the invention with a venturi.

A gas stream having the characteristics of

| Flow | 120,000 ACFM |
|---|---|
| Temperature | 280° F. |
| Dew Point | 150° F. |

Particulate Conc. 0.8 GR/DSCF (60% below 1μ) was treated to remove the particulate.

Two alternate procedures were used with both requiring presaturation of the gas.

|  | Static Pressure Variation: Venturi + Packed Bed | Conventional Venturi + Packed Bed |
|---|---|---|
| Pressure Drop System in. w.g. | 15 | 15 |
| Liquid Irrigation Venturi-GPM | 150 | 1500 |
| Fan Horsepower | 475 | 1100 |
| Effluent Particulate GR/DSCF | 0.01 | 0.05 |

By utilizing the static variation process, as shown in FIG. 2, and not imposing liquid droplet formation requirement on the venturi, the outlet particulate was 80% lower than by conventional means at a 57% reduction in fan horsepower.

Referring to FIG. 3, a gaseous stream is introduced in saturated condition into a fan 30. As the stream enters the duct 32, it is irrigated by a portion of a recycle liquid via conduit 34.

The total or static pressure decreases from $\pi_i$ to $\pi_f$ as the stream enters the hub zone of the fan (equivalent to zone 1 of FIG. 1). This stream is continually irrigated by a portion of the recycle liquid sprayed into this zone from total pressure $\pi_f$ to $\pi_o$, (equivalent to zone 2 of FIG. 1).

A gaseous stream having the characteristics

| Flow | 300,000 ACFM |
|---|---|
| Temperature | 300° F. |
| Dew point | 159° F. |

Particulate Conc. 1.5 GR/DSCF (50% below 1μ) was treated to remove the particulate.

Two alternate procedures were used to reduce the particulate concentration in the gas.

|  | Conventional Process U.S. Pat. No. 3,969,482 | Static Variation Process |
|---|---|---|
| System Pressure in. w.g. | 18 | 15 |
| Type Fan | Dry | Wetted |
| Liquid Recycle in Fan | None | 80 GPM* |
| Horsepower | 1550 | 1250 |
| Outlet Particulates GR/DSCF | 0.06 | 0.01 |

*The 80 GPM to the fan will have variable proportions of liquid to the inlet and fan housing wash depending on the wheel design. In the above example, the distribution was 50 GPM to the fan inlet and 30 GPM to the fan housing.

By incorporating the static variation process, the outlet particulate was reduced by 83% coupled with a reduction in fan horsepower of 19.35%.

My invention has been described generally and with specific examples. Regardless of the specific mode of operation, it is important that the gaseous stream being treated be saturated by water in zone one. Where the fan is used, water may be introduced at a rate 20-150 GPM/100,000 ACFM as liquid droplets in a range of 100-1500 microns. The fan pressure drop may range from 5-40 in w.g. The water irrigation and droplet size in the venturi is the same. The pressure drop is 3-5 in. w.g. net overall; from inlet to throat 10-25 in. w.g. and recovery 7-20 in w.g.

Having described my invention, what I now claim is:

1. A method for removing particulates from a gaseous stream which includes:

a. flowing the stream containing particulates of a size of one micron or less into a conduit at a static pressure of $P_1$, the stream containing liquid vapor at a partial pressure of $P_1$, a vapor pressure of $p_s$; and temperature $T_1$;

b. introducing excess liquid into the stream at temperature $T_1$ to form a saturated stream;

c. passing the saturated stream of step (b) into a first zone, said zone being downstream of the conduit and dimensioned to lower the static pressure to $P_2$ at temperature $T_1$; and to lower the partial pressure of the liquid vapor in the gas to $P_2$, less than $p_s$;

d. flowing the stream of step (c) into a second zone at temperature $T_1$, said second zone being downstream of the first zone and dimensioned to increase the static pressure in said second zone to $P_3$, which liquid partial pressure $P_3$ is greater than $P_2$; the partial pressure of the liquid vapor $P_3$ in said first zone being greater than the partial pressure of the liquid vapor $P_2$ in said first zone; the partial pressure of the liquid vapor $P_3$ in said second zone being greater than the equilibrium vapor pressure $P_s$ in second zone, at least a portion of the liquid condensing and contacting the particulates, the particulates functioning as nucleating agents to enhance the growth of the water droplets; and removing the particulate-infected water droples from the gaseous stream.

2. The method of claim 1 wherein the droplet size of the liquid introduced into the stream in the conduit is between about 50-2,000 microns.

3. The method of claim 1 wherein the liquid droplets are introduced at a rate of about 20-150 GPM per 100,000 ACFM.

4. The method of claim 1 wherein the saturated stream of step (b) is passed through a venturi having a converging section, a throat section defining said first zone and a diffuser defining said second zone.

5. The method of claim 1 wherein the saturated stream of step (b) is passed through a fan having an inlet, a hub zone defining said first zone and an outlet defining said second zone.

6. The method of claim 5 which includes introducing liquid droplets into said hub zone; and recycling a portion of the liquid droplets introduced into the hub zone into the inlet.

* * * * *